US012652134B2

(12) United States Patent
Fujishiro

(10) Patent No.: US 12,652,134 B2
(45) Date of Patent: Jun. 9, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 43 days.

(21) Appl. No.: 18/928,646

(22) Filed: Oct. 28, 2024

(65) Prior Publication Data

US 2025/0055605 A1    Feb. 13, 2025

Related U.S. Application Data

(63) Continuation of application No. PCT/JP2023/016512, filed on Apr. 26, 2023.

(30) Foreign Application Priority Data

Apr. 27, 2022    (JP) ................................. 2022-073808

(51) Int. Cl.
$H04L 1/18$          (2023.01)
$H04L 1/1829$        (2023.01)
$H04L 5/00$          (2006.01)
$H04W 28/04$         (2009.01)

(52) U.S. Cl.
CPC .......... *H04L 1/1848* (2013.01); *H04L 5/0055* (2013.01); *H04W 28/04* (2013.01)

(58) Field of Classification Search
None
See application file for complete search history.

(56) References Cited

U.S. PATENT DOCUMENTS 11,076,426 B2 * 7/2021 An ........................ H04W 28/02
2006/0190610 A1   8/2006 Motegi et al.
2007/0113140 A1 * 5/2007 Roh ...................... H04L 1/1671
                                                      714/776
2009/0031183 A1 * 1/2009 Hoshino ................... H04L 1/06
                                                      714/748

(Continued)

FOREIGN PATENT DOCUMENTS

CN        101772073  A     7/2010
JP        2006-217085 A    8/2006
WO        2021/229996 A1   11/2021

OTHER PUBLICATIONS

Nokia (Email discussion moderator); "New SID "Study on XR Enhancements for Nr""; 3GPP TSG RAN Meeting #94e; RP-213587; Electronic Meeting; Dec. 6-17, 2021; pp. 1-5.

(Continued)

*Primary Examiner* — Mujtaba M Chaudry
(74) *Attorney, Agent, or Firm* — Studebaker Brackett PLLC

(57)                    ABSTRACT
A communication control method according to one aspect is a communication control method in a mobile communication system. The communication control method includes the steps of, at a base station: transmitting, to a user equipment, a skip notification indicating that transmission of a transmission packet is skipped when the base station does not retransmit the transmission packet; and configuring, for the user equipment, a timer value of a high-speed retransmission timer having a shorter timer value than a reference timer when the base station retransmits the transmission packet.

9 Claims, 7 Drawing Sheets

TRANSMISSION SIDE

RECEPTION SIDE

S11
EXPIRATION DATE OF PACKET EXPIRES

SKIP NOTIFICATION    S12

S13
PERFORM PROCESSING ASSUMING THAT PACKET HAS BEEN RECEIVED

(56)                References Cited

U.S. PATENT DOCUMENTS

| 2009/0213940 | A1* | 8/2009 | Steinbach | ............ | H04N 19/895 |
| | | | | | 375/E7.208 |
| 2010/0103932 | A1* | 4/2010 | Kako | ................. | H04L 12/2856 |
| | | | | | 370/389 |
| 2010/0278121 | A1* | 11/2010 | Chun | .................... | H04W 72/23 |
| | | | | | 370/329 |
| 2014/0016460 | A1* | 1/2014 | Nadas | ................... | H04L 1/1838 |
| | | | | | 370/230 |
| 2017/0055248 | A1* | 2/2017 | Moon | ................... | H04L 1/1812 |
| 2017/0303215 | A1* | 10/2017 | Kim | ...................... | H04W 52/48 |
| 2020/0396024 | A1* | 12/2020 | Ganesan | .............. | H04L 1/1864 |
| 2022/0151021 | A1* | 5/2022 | Sheik | ................... | H04L 5/0055 |
| 2023/0076524 | A1 | 3/2023 | Fujishiro | | |

OTHER PUBLICATIONS

3rd Generation Partnership Project; Technical Specification Group Radio Access Network; Study on XR (Extended Reality) Evaluations for NR (Release 17); 3GPP TR 38.838 V17.0.0; Dec. 2021; pp. 1-272.

* cited by examiner

COMMUNICATION CONTROL METHOD

RELATED APPLICATIONS

The present application is a continuation based on PCT Application No. PCT/JP2023/016512, filed on Apr. 26, 2023, which claims the benefit of Japanese Patent Application No. 2022-073808 filed on Apr. 27, 2022. The content of which is incorporated by reference herein in their entirety.

TECHNICAL FIELD

The present disclosure relates to a communication control method in mobile communication systems.

BACKGROUND

In specifications of the Third Generation Partnership Project (3GPP) (registered trademark. The same applies below) that is a standardization project for mobile communication systems, extended Reality (XR) has been approved for Release 18. XR is a broad term that includes Virtual Reality (VR), Augmented Reality (AR), and Mixed Reality (MR), and represents an environment obtained by merging a real world and a virtual space. XR represents a mixed environment of a real space and a virtual space generated by computer technology and wearable devices, and expresses an interaction between a human and a machine.

CITATION LIST

Non-Patent Literature

Non-Patent Document 1: RP-213587, 3GPP TSG RAN Meeting #94e, "Study on XR Enhancements for NR", Nokia, Dec. 6-17, 2021.
Non-Patent Document 2: 3GPP TR 38.838 V17.0.0 (2021-12)

SUMMARY

A communication control method according to one aspect is a communication control method in a mobile communication system. The communication control method includes the steps of, at a base station: transmitting, to a user equipment, a skip notification indicating that transmission of a transmission packet is skipped when the base station does not retransmit the transmission packet; and configuring, for the user equipment, a timer value of a high-speed retransmission timer having a shorter timer value than a reference timer when the base station retransmits the transmission packet.

A communication control method according to one aspect is a communication control method in a mobile communication system. The communication control method includes the step of transmitting, at a user equipment to a base station, a skip notification indicating that transmission of a transmission packet is skipped when the user equipment does not retransmit the transmission packet.

DESCRIPTION OF EMBODIMENTS

An aspect of the present disclosure provides a communication control method that can appropriately perform communication using XR.

A mobile communication system according to an embodiment is described with reference to the drawings. In the description of the drawings, the same or similar parts are denoted by the same or similar reference signs.

First Embodiment

Configuration of Mobile Communication System

Figure 1:
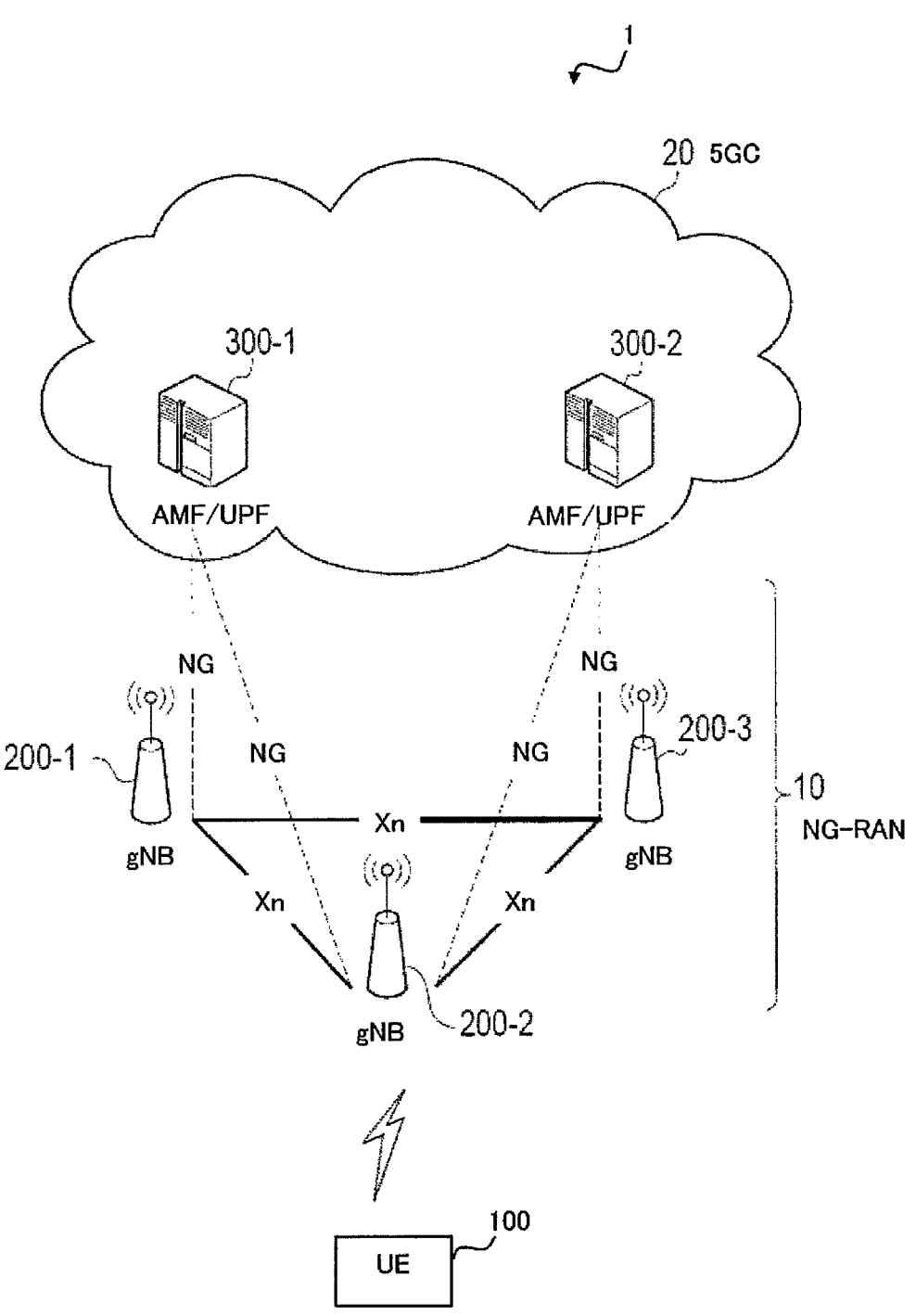
FIG. 1 is a diagram illustrating a configuration example of a mobile communication system according to a first embodiment.

FIG. 1 is a diagram illustrating a configuration of a mobile communication system according to a first embodiment. The mobile communication system 1 complies with the 5th Generation System (5GS) of the 3GPP standard. The description below takes the 5GS as an example, but Long Term Evolution (LTE) system may be at least partially applied to the mobile communication system. Alternatively, a sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20. The NG-RAN 10 may be hereinafter simply referred to as a RAN 10. The 5GC 20 may be simply referred to as a core network (CN) 20.

The UE 100 is a mobile wireless communication apparatus. The UE 100 may be any apparatus as long as the UE 100 is used by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The UE 100 includes an XR device. The XR device is, for example, a device that can process XR. More specifically, the XR device includes a Head Mount Display (HMD) that can be mounted on a head of a person, an eyeglass-type AR glass (or smart glass), a mobile handset that can be held by a hand, a wristwatch-type device (smartwatch), and a smartphone. These XR devices may be referred to as wearable devices. The HMD includes a display, a lens, a tracking sensor, a camera, a control unit (such as a Central Processing Unit (CPU) or a Graphics Processing Unit (GPU)) that performs processing related to the XR, and a communication function. The AR glass has a function of allowing a video to transmit therethrough. The mobile handset may include various sensors such as tracking sensors. The HMDs, the AR glasses, the wristwatch-type devices, and the mobile handsets have communication functions that support the 5G systems and the like. Hereinafter, the UE 100 will be described assuming that the UE 100 includes such an XR device.

The NG-RAN 10 includes base stations (referred to as "gNBs" in the 5G system) 200. The gNBs 200 are interconnected via an Xn interface, which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency (hereinafter simply referred to as one "frequency").

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface, which is an interface between a base station and the core network.

Figure 2:
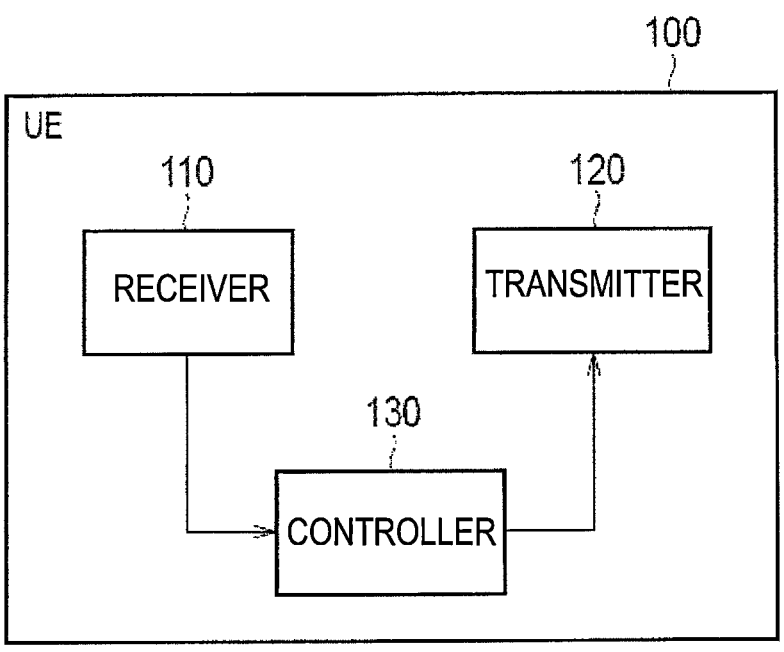
FIG. 2 is a diagram illustrating a configuration example of a user equipment (UE) according to the first embodiment.

FIG. 2 is a diagram illustrating a configuration of the user equipment (UE) 100 according to the first embodiment. The UE 100 includes a receiver 110, a transmitter 120, and a controller 130. The receiver 110 and the transmitter 120 constitute a wireless communicator that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processing in the UE 100. Such processing includes processing of respective layers to be described later. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. Note that the controller 130 may perform each processing and each operation in the UE 100 in each embodiment to be described below.

Figure 3:
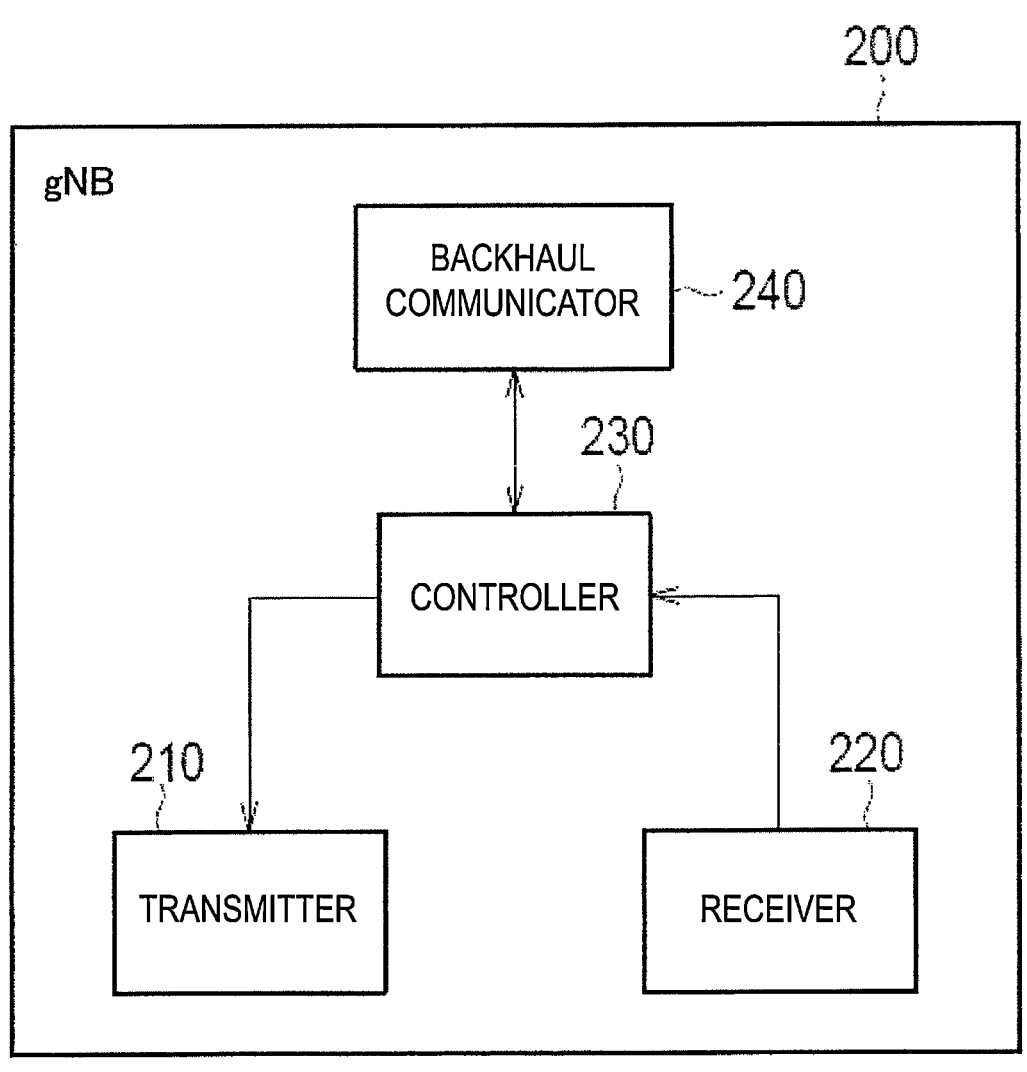
FIG. 3 is a diagram illustrating a configuration example of a gNB (base station) according to the first embodiment.

FIG. 3 is a diagram illustrating a configuration of the gNB 200 (base station) according to the first embodiment. The gNB 200 includes a transmitter 210, a receiver 220, a controller 230, and a backhaul communicator 240. The transmitter 210 and the receiver 220 constitute a wireless communicator that performs wireless communication with the UE 100. The backhaul communicator 240 constitutes a network communicator that performs communication with the CN 20.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processing in the gNB 200. Such processing includes processing of respective layers to be described later. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. Note that the controller 230 may perform all of the processing and operations in the gNB 200 in each embodiment to be described below.

The backhaul communicator 240 is connected to a neighboring base station via an Xn interface, which is an inter-base station interface. The backhaul communicator 240 is connected to the AMF/UPF 300 via a NG interface between a base station and the core network. Note that the gNB 200 may include a Central Unit (CU) and a Distributed Unit (DU) (i.e., functions are divided), and the two units may be connected via an F1 interface, which is a fronthaul interface.

Figure 4:
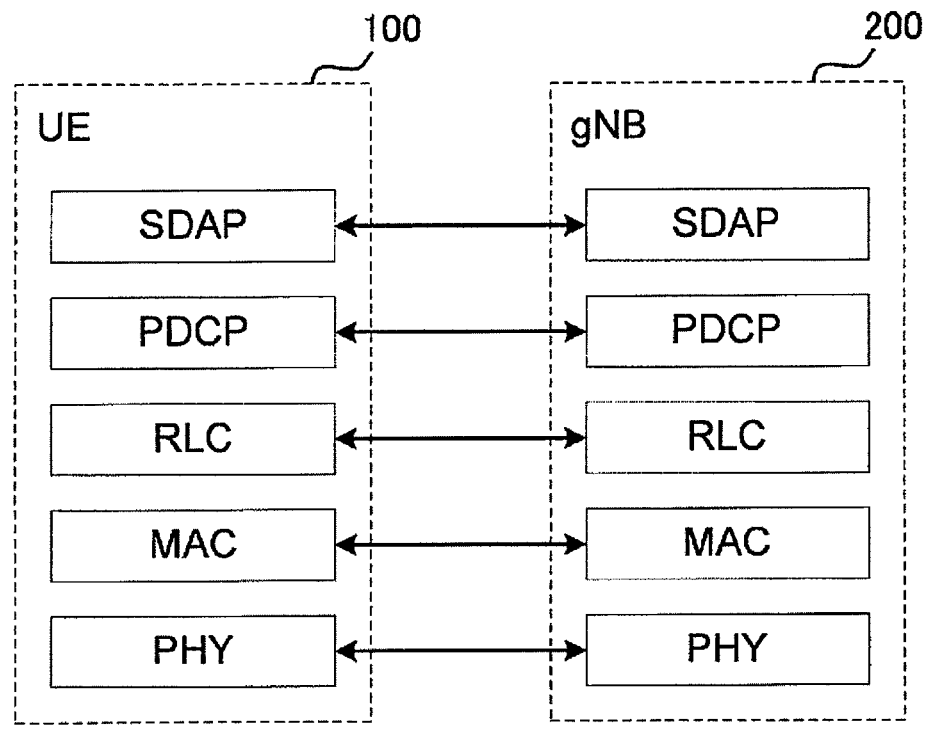
FIG. 4 is a diagram illustrating a configuration example of a protocol stack for a user plane according to the first embodiment.

FIG. 4 is a diagram illustrating a configuration of a protocol stack of a radio interface of a user plane handling data.

A radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel. Note that the PHY layer of the UE 100 receives downlink control information (DCI) transmitted from the gNB 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the gNB 200 is appended with CRC parity bits scrambled by the RNTI.

The MAC layer performs priority control of data, retransmission processing through Hybrid Automatic Repeat reQuest (HARQ: hybrid ARQ), a random access procedure, and the like. Data and control information are transmitted between the MAC layer of the UE 100 and the MAC layer of the gNB 200 via a transport channel. The MAC layer of the gNB 200 includes a scheduler. The scheduler decides transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QOS) control performed by a core network and a radio bearer as the unit of QoS control performed by an Access Stratum (AS). Note that, when the RAN is connected to the EPC, the SDAP need not be provided.

Figure 5:
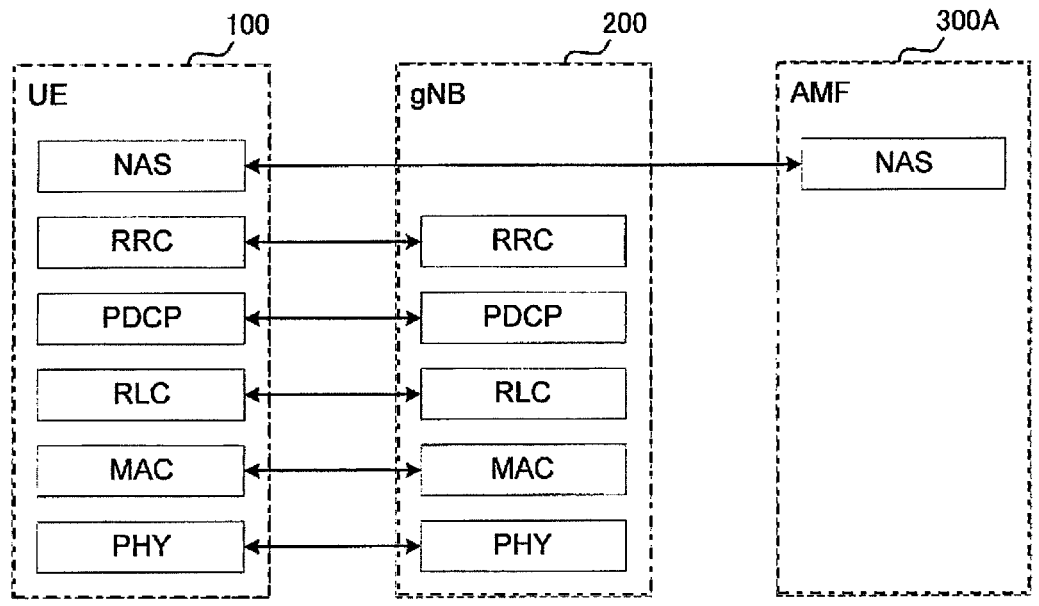
FIG. 5 is a diagram illustrating a configuration example of a protocol stack for a control plane according to the first embodiment.

FIG. 5 is a diagram illustrating a configuration of a protocol stack of a radio interface of a control plane handling signaling (a control signal).

The protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection (RRC connection) between the RRC of the UE 100 and the RRC of the gNB 200 is present, the UE 100 is in an RRC connected state. When no connection (RRC connection) between the RRC of the UE 100 and the RRC of the gNB 200 is present, the UE 100 is in an RRC idle state. When the connection between the RRC of the UE 100 and the RRC of the gNB 200 is suspended, the UE 100 is in an RRC inactive state.

The NAS, which is positioned upper than the RRC layer, performs session management, mobility management, and the like. NAS signaling is transmitted between the NAS of the UE 100 and the NAS of the AMF 300. Note that the UE 100 includes an application layer other than the protocol of the radio interface. A layer lower than the NAS is referred to as Access Stratum (AS).

XR

As described above, XR is a broad term that includes, for example, Virtual Reality (VR), Augmented Reality (AR), and Mixed Reality (MR) and represents an environment obtained by merging a real world and a virtual space. XR is also, for example, a generic term for such various types of realities. XR is also, for example, a generic term for a technology that enables perception of something that does not exist in reality by, for example, merging the real world and the virtual space.

According to XR, the UE 100 that is a portable or wearable end-user device assists human-to-machine or human-to-human communication to execute. Such communication enables application of XR to various application fields such as entertainment, healthcare, or education.

In addition to XR, Cloud Gaming (CG) is one of use cases in future mobile systems. Cloud gaming is, for example, a generic term for use cases where most of computation related to a game is offloaded to an edge server or a remote server. According to cloud gaming, the UE 100 transmits information related to pose and/or control. A cloud side performs computation and the like related to video data or the like based on these pieces of information, and provides videos and the like related to the game to the UE 100.

Note that Virtual Reality (VR) refers to creating an environment that is not an original (or a real world), yet whose functional essence is the same as the original by stimulating a user's sense. According to Virtual Reality (VR), a user generally wears an HMD, the user's field of view is replaced with simulated visual elements, and accompanying audios are provided to the user through a headphone. The virtual space is designed to mimic sensory stimulation of a visual sense, an auditory sense, or the like of the real world as naturally as possible. Metaverse that is a virtual space (or service) constructed in a computer or a computer network and is different from the real world may be also included in Virtual Reality (VR).

Augmented Reality (AR) is, for example, a technique of superimposing a virtual space on the real world to display. Augmented Reality (AR) also provides additional information (artificially generated items or content) by superimposing the additional information on an environment of user's reality. The additional information may be also directly perceived without a sensor or the like, or indirectly perceived via a sensor or the like.

Mixed Reality (MR) is a technique that mixes and/or merges, for example, a real world and a virtual space to construct spaces that influence each other in real time. Mixed Reality (MR) is a development form of Augmented Reality (AR) and is constructed with the intention of inserting virtual elements into a physical scene and giving an illusion that the virtual elements are part of an actual scene.

Representative forms of XR are Virtual Reality (VR), Augmented Reality (AR), and Mixed Reality (MR), and XR includes fields for interpolating between these VR, AR, and MR, too.

In many uses cases of XR and Cloud Gaming (CG), a DL direction is characterized by video stream traffic and a UL direction is characterized by traffic that is a combination of pose and/or control and a video stream. The video stream also has a feature that the video stream has a relatively high data rate, and data related to pose and/or control is frequently updated. XR and Cloud Gaming (CG) also have a feature that traffic in the DL direction and traffic in the UL direction are traffic that are strict against delay as compared to other use cases.

XR Traffic Models

Hereinafter, XR traffic models will be described. The XR traffic models include (1) general traffic models and (2) specific traffic models. First, (1) the general traffic models will be described. (1) The general traffic models include (1.1) traffic models in the DL direction and (1.2) traffic models in the UL direction.

(1) General Traffic Models (1.1) Traffic Models in DL Direction

The traffic models in the DL direction include a single-stream DL traffic model and a multi stream DL traffic model. The two traffic models can be summarized as follows.

(1.1.1) Single Stream DL Traffic Model: Series of Video Frames (1.1.2) Multi Stream DL Traffic Model:

(1.1.2.1) Option #1:

Two Streams of First Stream That Is Intra-Coded (I) Stream and Second Stream That Is Predicted (P) Stream. Option #1 includes a slice-based traffic model (option #1A) and a Group-Of-Picture (GOP)-based traffic model (option #1B).

7

(1.1.2.1A) Option #1A (slice-based):

First Stream Is I Slice (I stream), and Second Stream Is P Slice (P stream). The I slice is, for example, a slice obtained by encoding all macroblocks included in the I slice by intra-frame prediction. The P slice is, for example, a slice obtained by encoding all macroblocks included in the P slice by intra-frame prediction or inter-frame prediction. When a video frame is sliced into N frames, one frame may be the I slice and the remaining (N−1) frames may be the P slices.

(1.1.2.1B) Option #1B (GOP-Based):

First Stream Is I Frame (I Stream), and Second Stream Is P Slice (P Stream). The I frame is a frame encoded from the corresponding video frame without using another video frame. The P frame is a frame encoded using a video frame in a temporally forward direction. When a GOP size is K frames, the I frame is transmitted every K frames. The GOP includes the one I frame and the (K−1) P frames.

(1.1.2.2) Option #2:

Traffic Model Includes Two Streams of First Stream That Is Video and Second Stream That Is Audio and/or Data.

(1.1.2.3) Option #3:

Traffic Model Includes First Stream That Is Field of View (FOV) and Second Stream That Is Omnidirectional View. For example, the FOV is video data of a user's line of sight, and the omnidirectional view is video data of omnidirections that includes the video data of the user's line of sight and whose center is the user.

(1.2) Traffic Models in UL Direction

The traffic models in the UL direction include pose and/or control stream traffic models. The traffic models are traffic models in which the UE 100 transmits data related to pose and/or control.

(2) Specific Traffic Models

Specific traffic models include (2.1) a Virtual Reality (VR) traffic model, (2.2) an Augmented Reality (AR) traffic model, and (2.3) a Cloud Gaming (CG) traffic model.

(2.1) Virtual Reality (VR) Traffic Model

The Virtual Reality (VR) traffic model can be summarized as follows.

(2.1.1) DL Stream:

Single Stream Model: Identical to Above (1.1.1) "Single Stream DL Traffic Model" (Series of Video Frames)

Multi Stream Model: Identical to Above (1.1.2.2) "Option #2" (First Stream Is Video and Second Stream Is Audio and/or Data)

(2.1.2) UL Stream:

Identical to Above (1.2) "Traffic Model in UL Direction".

(2.2) Augmented Reality (AR) Traffic Model

The Augmented Reality (AR) traffic model can be summarized as follows.

(2.2.1) DL Stream:

Identical to Above (2.1.1)

(2.2.2) UL Stream:

Model #1:1 Stream Model

Model #2:2 Stream Model: First Stream Is Pose and/or Control, and Second Stream Is Collection of Scene (e.g., Continuous Video), Video, Data, and Audio Model #3A: 3 Stream Model A: First Stream Is Pose and/or Control, Second Stream Is One Stream of Collection of Stream of Scene and Stream of Video, and Third Stream Is One Stream of Collection of Audio and Data.

Model #3B: 3 Stream Model B: First Stream Is Pose and/or Control, Second Stream Is I Stream of Video, and Third Stream Is P Streams of Video

8

(2.3) Cloud Gaming (CG) Traffic Model

The Cloud Gaming (CG) traffic model can be summarized as follows.

(2.3.1) DL Stream

Single Stream Model: Identical to Above (1.1.1) "Single Stream DL Traffic Model" (Series of Video Frames)

Multi Stream Model: Identical to Above (1.1.2) "Multi Stream DL Traffic Model"

(2.3.2) UL Stream:

Identical to Above (1.2) "Traffic Model in UL Direction".

Communication Control Method According to First Embodiment

As described above, a video stream may be used for the XR traffic, and a large amount of data may be transmitted compared to other traffics. The XR traffic requests real-time performance in a case of Cloud Gaming (CG), and requests low delay compared to other traffics.

Since, according to the XR traffic, a video stream or the like is considered to periodically cause traffic, use of a scheduling scheme that is called Semi-Persistent Scheduling (SPS) or Configured Grant (CG) that enables periodic transmission or reception is assumed. SPS and CG are scheduling schemes that, when radio resources are allocated first through Downlink Control Information (DCI), can then periodically use the radio resources without using the DCI. In the 5G system, SPS is the scheduling scheme in the DL direction, and the CG is the scheduling scheme in the UL direction.

A case is assumed where, when transmission or reception of a certain packet fails in the XR traffic, the certain packet is retransmitted. According to 3GPP, a MAC layer supports Hybrid Automatic Repeat Request (HARQ). HARQ is a retransmission control scheme that is a combination of Automatic Repeat reQuest (ARQ) and Forward Error Correction (FEC). According to HARQ, for example, a transmission side performs retransmission in units of code blocks constituting a Transport Block (TB) (MAC PDU), and a reception side can combine (soft-combine) already received data accumulated in a buffer and retransmission data and obtain a transmission packet. The RLC layer also supports ARQ. According to ARQ in the RLC layer, a reception side transmits an RLC status report to the transmission side when the reception side detects a missing RLC SDU or RLC SDU segment, and the transmission side retransmits the RLC SDU or the RLC SDU segment based on the RLC status report. ARQ of the RLC layer plays, for example, a role of compensating for residual errors of HARQ of the MAC layer.

While the mobile communication system 1 also supports such a retransmission control scheme, the XR traffic may not need a retransmission packet. When, for example, a next video stream is already transmitted, a delay packet is unnecessary for the reception side. When, for example, a direction of the HMD is changed, the delay packet is unnecessary for the reception side. Even when HARQ or the like is retransmitted in such a case, a retransmission packet may be unnecessary for the reception side. In this case, when the transmission side unilaterally stops transmission of a retransmission packet, the reception side waits for reception of the retransmission packet while the received packet is stored in the buffer, and therefore the retransmission packet is not normally received or delivery of the packet to the upper layer is delayed.

Therefore, performing retransmission control through HARQ or the like in the XR traffic may not necessarily be efficient communication.

On the other hand, when the XR traffic causes retransmission in an important scene or the like, retransmission may be more preferably performed. In this case, retransmission is preferably performed earlier than normal retransmission.

According to the embodiment, when a transmission packet is not retransmitted, a transmission apparatus transmits to a reception apparatus a skip notification indicating that transmission of the transmission packet is skipped. On the other hand, when the transmission packet is retransmitted, the gNB 200 configures for the UE 100 the high-speed retransmission timer having a shorter timer value than the reference timer.

More specifically, the base station (e.g., gNB 200) transmits to the user equipment (e.g., UE 100) the skip notification indicating that transmission of the transmission packet is skipped when the base station does not retransmit the transmission packet, and configures for the user equipment the timer value of the high-speed retransmission timer having a shorter timer value than the reference timer when the base station retransmits the transmission packet.

The skip notification is transmitted when retransmission is not performed as described above, so that the reception side can perform appropriate processing of, for example, outputting to the upper layer the received packet that is waiting for retransmission. On the other hand, when retransmission is performed, the UE 100 can activate the high-speed retransmission timer having a timer value whose expiration time is shorter than that of the reference timer. Consequently, the UE 100 can receive the retransmission packet after the timer expires, so that the retransmission packet can be received earlier than a case where the reference timer is used. Accordingly, the mobile communication system 1 can appropriately perform communication that uses XR.

Note that the first embodiment will describe a case where retransmission is not performed. That is, the first embodiment will describe an example of a skip notification. The second embodiment will describe a case where retransmission is performed, i.e., an example of the high-speed retransmission timer.

Operation Example of First Embodiment

Figure 6A:
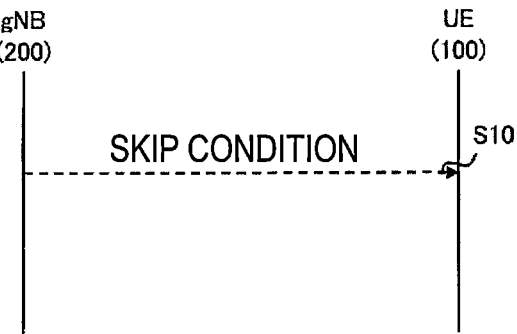
FIGS. 6A and 6B are diagrams illustrating an operation example according to the first embodiment.
Figure 6B:
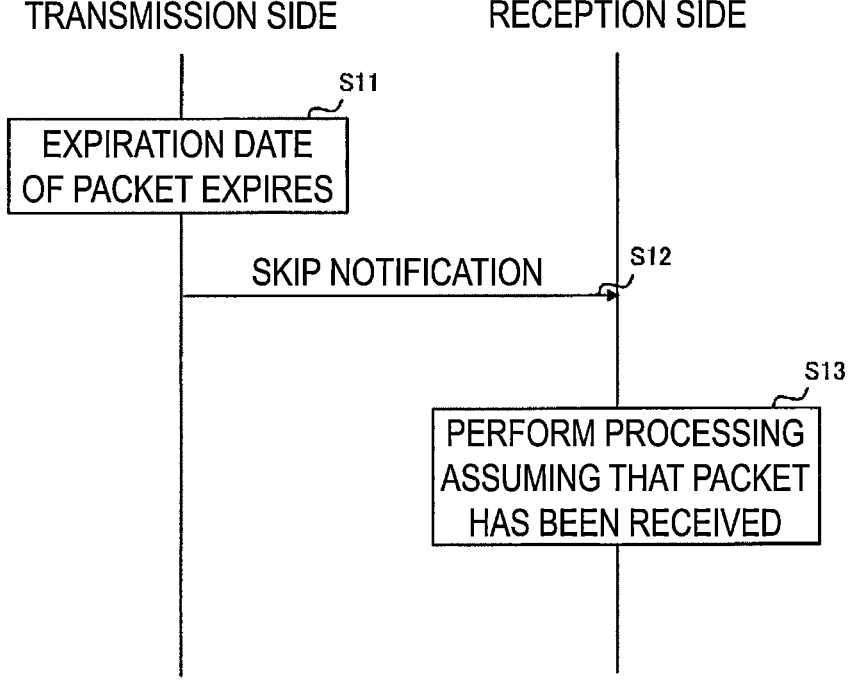

FIGS. 6A and 6B are diagrams illustrating operation examples according to the first embodiment.

The gNB 200 may perform retransmission in the DL direction, and the UE 100 may perform retransmission in the UL direction. That is, as for retransmission, there may be also a case where the transmission side is the gNB 200 and the reception side is the UE 100 (i.e., DL direction), and there may be also a case where the transmission side is the UE 100 and the reception side is the gNB 200 (i.e., UL direction). The operation example according to the first embodiment will be described assuming the transmission side and the reception side. In this case, when the transmission side (or the transmission apparatus) is the gNB 200, the reception side (or the reception apparatus) is the UE 100, and, when the transmission side is the UE 100, the reception side is the gNB 200.

Note that FIGS. 6A and 6B temporally continue. However, for example, before the operation in FIG. 6B is started, for example, the state is as follows. That is, it is assumed that, although the transmission side transmits a transmission packet to the reception side, the reception side cannot receive the transmission packet and transmits a retransmission request (e.g., NACK of HARQ-feedback) to the transmission side.

As illustrated in FIG. 6A, in step S10, the gNB 200 may transmit a skip condition to the UE 100. In this case, as for retransmission, the UE 100 is the transmission side of the transmission packet, and the gNB 200 is the reception side of the transmission packet. The skip condition is applied to retransmission of the transmission packet from the UE 100.

The skip condition is, for example, as follows.

Firstly, the skip condition may be a stay time of the transmission packet. The stay time of the transmission packet may indicate an upper limit value of a time taken until an AS of the transmission side receives the transmission packet from the application layer and transmission of the transmission packet to the reception side is completed (reception of the Ack may be completed). The stay time of the transmission packet may be a timer value of a timer that counts the stay time.

Secondly, the skip condition may be the number of times of retransmission. The number of times of retransmission may be an upper limit number of times of retransmission through HARQ. Alternatively, the number of times of retransmission may be an upper limit number of times of retransmission through ARQ in the RLC layer. Different upper limit numbers of times or the same upper limit number of times may be configured for each of the two upper limit numbers of times. The number of times of retransmission may be an upper limit of the number of times of reception of NACK from the reception side.

Note that the skip condition may be transmitted before retransmission is performed. Alternatively, the skip condition may be transmitted during retransmission. The gNB 200 may include and transmit skip information in DCI, a MAC PDU, or an RRC message.

As illustrated in FIG. 6B, in step S11, the transmission side retransmits the transmission packet, and recognizes that the expiration date of the transmission packet has expired. The transmission side may recognize that the transmission packet does not need to be transmitted. The transmission side may recognize that, when the transmission packet satisfies a condition relating to the expiration date of the transmission packet, the expiration date of the transmission packet has expired. The condition relating to the expiration date may be the skip condition (step S10). When, for example, the transmission packet satisfies the skip condition (step S10), the UE 100 (transmission side) recognizes that the expiration date of the transmission packet has expired. The condition relating to the expiration date may be a QoS condition indicated by the QoS configuration. When, for example, the transmission packet does not satisfy the QoS condition indicated by the QoS configuration, the gNB 200 (transmission side) recognizes that the expiration date of the transmission packet has expired (or the packet does not need to be transmitted). The QoS condition may be indicated by the 5QI.

In step S12, the transmission side transmits to the reception side a skip notification indicating that transmission of the transmission packet is skipped. For example, the transmission side transmits the skip notification to the reception side when the transmission packet satisfies a condition (step S11) relating to the expiration date of the transmission packet. Alternatively, when, for example, the transmission packet satisfies the skip condition (step S10), the UE 100 transmits the skip notification to the gNB 200.

Firstly, the skip notification is transmitted using, for example, a following message. That is, the transmission side may transmit an SDAP Control PDU including the skip notification to the reception side. The SDAP layer maps a QoS flow and a radio bearer (DRB), so that the transmission side can transmit the skip notification in units of QoS flows by using the SDAP Control PDU. The transmission side may transmit a PDCP Control PDU including the skip notification to the reception side. In this case, for example, the transmission side can transmit the skip notification in units of PDCP PDUs. The transmission side may transmit an RLC Control PDU including the skip notification to the reception side. In this case, for example, the transmission side may transmit the skip notification in units of RLC SDU segments (or in units of RLC SDUs). The transmission side may transmit an RRC message including the skip notification.

Secondly, contents of the skip notification are, for example, as follows. That is, the skip notification includes a Sequence Number (SN) of a transmission packet to be skipped. When a plurality of transmission packets are skipped, the skip notification may include a range of the SN of the transmission packet to be skipped. The skipping target SN may be indicated by a PDCP SN. Alternatively, the skipping target SN may be indicated by a COUNT value obtained by combining a Hyper Frame Number (HFN) and the PDCP SN. The skipping target SN may be indicated by the RLC SN. The skip notification may not include the SN of the transmission packet to be skipped, but may include information indicating that a next packet is not transmitted. When transmission of a plurality of packets is skipped, the skip notification may include information indicating that next N packets (e.g., the number of SNs to be skipped or the number of packets to be skipped) are skipped. The skip notification may include information that designates a state variable of a reordering window of the reception side. The reordering window may be a reordering window of a PDCP, and the state variable may be RX_NEXT indicating a COUNT value of a PDCP SDU that is expected to be received next.

Note that the transmission side may discard a transmission packet that is a skip notification target.

In step S13, in response to reception of the skip notification, the reception side performs processing assuming that the transmission packet has been received.

Firstly, the PDCP layer performs, for example, the following processing. That is, the PDCP layer of the reception side may output a transmission packet that has been received and is waiting for retransmission to an upper layer of the PDCP layer. Thus, for example, a state where the received packet remains stacked in a buffer or the like can be resolved, and delay in delivery of the received packet to the upper layer can be suppressed. The PDCP layer of the reception side may set a lower limit value of the reordering window to a next PDCP SN (or COUNT value) of the transmission packet. Since the skip notification includes the PDCP SN, the PDCP layer may use this the skip notification. The PDCP layer of the reception side may notify the lower layer (such as the RLC layer) of that packet reception is skipped.

Secondly, the RLC layer performs, for example, following processing. That is, the RLC layer of the reception side may discard the received RLC SDU or RLC SDU segment. The RLC layer of the reception side sets the lower limit value of the reordering window to a next SN of the transmission packet. The RLC layer of the reception side may notify an upper layer (such as the PDCP layer) of that packet reception is skipped.

As described above, in the first embodiment, when the gNB 200 (transmission apparatus) does not retransmit a transmission packet, the gNB 200 transmits to the UE 100 (reception apparatus) the skip notification indicating that transmission of the transmission packet is skipped. In the first embodiment, when the UE 100 (transmission apparatus) does not retransmit the transmission packet, the UE 100 transmits to a base station (reception apparatus) the skip notification indicating that transmission of the transmission packet is skipped.

Second Embodiment

The second embodiment will describe an example of a case where a transmission packet is retransmitted.

The XR traffic may request real-time performance in use cases of Augmented Reality (AR) or Cloud Gaming (CG). Hence, the XR traffic requests low delay compared to other traffics. When retransmission of the XR traffic occurs in such a situation, transmitting the skip notification from the transmission side to the reception side under a certain condition such that the transmission side does not perform retransmission as in the first embodiment is also one measure. On the other hand, as described above, retransmission may also occur during a video scene or the like that is important compared to other scenes. In such a case, retransmission is preferably performed, and retransmission is preferably performed earlier than normal retransmission from a viewpoint of a request for low delay of the XR traffic.

Hereinafter, the second embodiment will describe an example where the high-speed retransmission timer having a shorter timer value than the reference timer is used.

More specifically, the base station (e.g., gNB 200) configures for the user equipment (e.g., UE 100) the timer value of the high-speed retransmission timer having a shorter timer value than the reference timer. Firstly, the base station transmits the timer value of the high-speed retransmission timer to the user equipment. Secondly, when failing to receive the transmission packet, the user equipment activates the high-speed retransmission timer. Thirdly, when the timer value of the high-speed retransmission timer expires, the user equipment tries to receive the transmission packet.

Thus, for example, even when failing to receive the transmission packet transmitted from the gNB 200, the UE 100 can attempt to receive the transmission packet in a time whose expiration time is shorter than that of the reference timer, so that the retransmission packet can be received at a high speed compared to a case where the reference timer is used. Accordingly, the mobile communication system 1 can appropriately perform communication that uses XR.

Operation Example According to Second Embodiment

Figure 7:
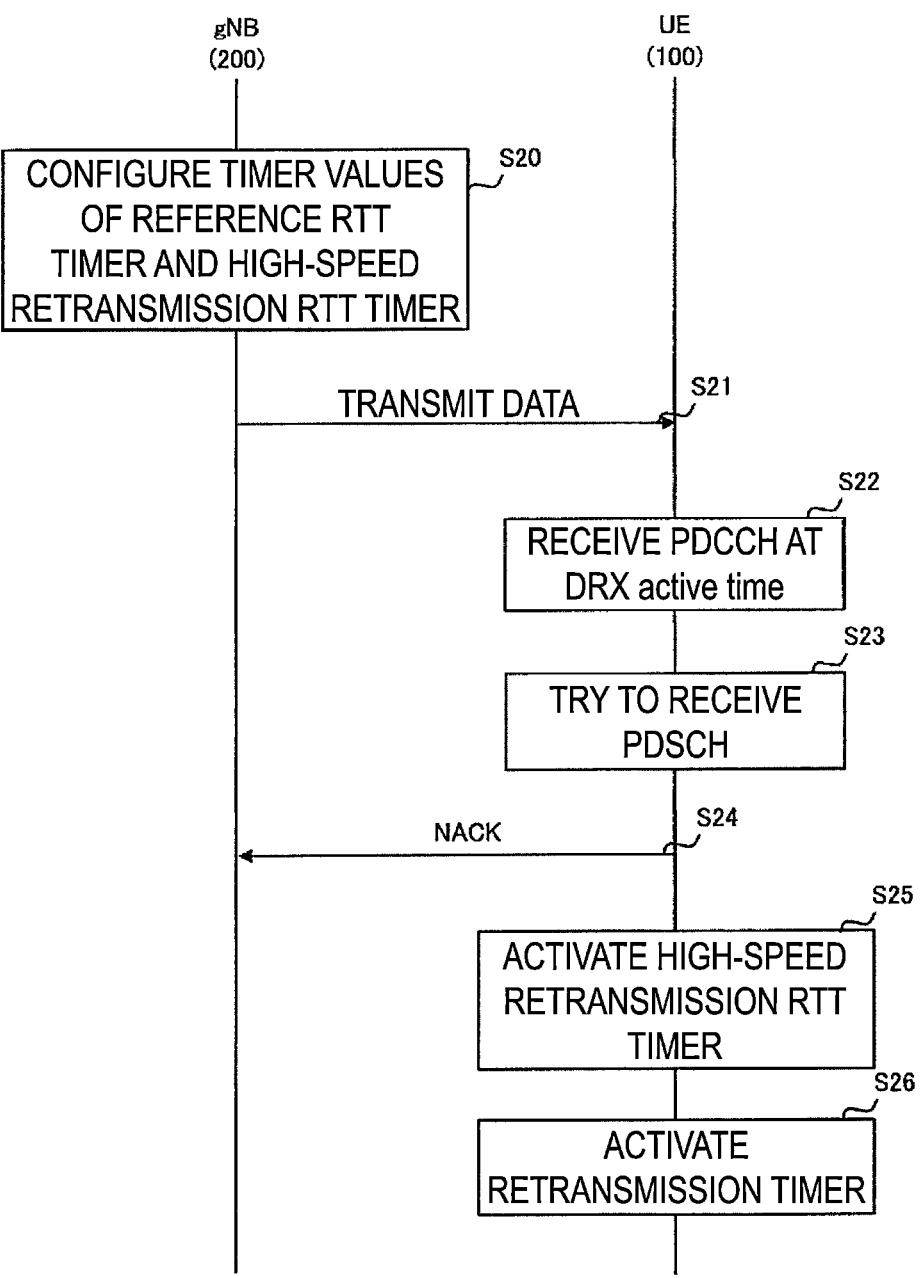
FIG. 7 is a diagram illustrating an operation example according to a second embodiment.

FIG. 7 is a diagram illustrating an operation example according to the second embodiment.

As illustrated in FIG. 7, in step S20, the gNB 200 configures a timer value of a reference Round Trip Timer (RTT) timer and a timer value of a high-speed retransmission RTT timer having a shorter timer value than the RTT timer. For example, the reference timer is the reference RTT timer, and the high-speed retransmission timer is the high-speed retransmission RTT timer. The reference RTT timer is, for example, an HARQ RTT timer used for retransmission control (HARQ) of Discontinuous Reception (DRX).

DRX can reduce power consumption of the UE 100 by causing the target UE 100 to discontinuously monitor a PDCCH of the target UE 100 compared to a case where the UE 100 continuously monitors the PDCCH. When entering a DRX cycle, the UE 100 activates an on duration timer (OnDurationTimer), and monitors the PDCCH for a duration (On Duration) until the timer expires. When the UE 100 cannot receive a transmission packet even though the UE 100 is instructed to receive the transmission packet using the PDCCH in the on duration, the MAC layer of the UE 100 performs retransmission control through HARQ, and requests the gNB 200 to retransmit the transmission packet. The MAC layer activates a HARQ RTT timer when the transmission packet cannot be received (or when a retransmission request is made). Since a certain time is taken from the retransmission request of the transmission packet to reception of the transmission packet, the HARQ RTT timer can be activated and the UE 100 can be caused to go dormant for a certain time (the timer value of the HARQ RTT timer). When the HARQ RTT timer expires, the MAC layer activates a DRX retransmission timer (drx-Retransmission-Timer), and tries to receive a transmission packet (i.e., retransmission packet) while the DRX retransmission timer is operating. The MAC layer stops the DRX retransmission timer when the transmission packet is received, and tries to receive the transmission packet until the DRX retransmission timer expires when the transmission packet cannot be received. In the second embodiment, the high-speed retransmission RTT timer having a shorter timer value than the HARQ RTT timer is used, and the DRX retransmission timer is activated at an earlier time than the HARQ RTT timer to achieve high-speed retransmission. Hence, the gNB 200 configures two timer values such that X>Y holds for a timer value X of the HARQ RTT timer and a timer value Y of the high-speed retransmission timer. The gNB 200 transmits the two configured timer values to the UE 100. The gNB 200 may include and transmit the two configured timer values in an RRC message, or a MAC PDU, DCI.

Note that it is assumed that the gNB 200 has performed DRX configuration for the UE 100 prior to step S20.

In step S21, the gNB 200 transmits data to the UE 100.

In step S22, the UE 100 receives the PDCCH in a DRX active time. The DRX active time is, for example, a time during which an on duration timer (OnDurationTimer) is operating. The gNB 200 may instruct application of the high-speed retransmission timer using the PDCCH. For example, the gNB 200 may transmit to the UE 100 using the PDCCH a new DCI format indicating that the high-speed retransmission RTT timer is applied. For example, the gNB 200 may instruct application of the high-speed retransmission RTT timer using information (bits) of the DCI.

In step S23, the UE 100 tries to receive the PDSCH using the DCI received using the PDCCH. It is assumed that the UE 100 fails to decode the PDSCH.

In step 24, the UE 100 transmits NACK as a HARQ-feedback, and, in step S25, the UE 100 activates the high-speed retransmission RTT timer. Steps S24 and S25 may be simultaneously performed. In step S24, the UE 100 may notify the gNB 200 of that the high-speed retransmission RTT timer is applied (activated). The notification may be performed using a Physical Up-link Control CHannel (PUCCH) or may be indicated by a special NACK signal.

In step S26, when the high-speed retransmission RTT timer expires, the UE 100 activates a DRX retransmission timer (drx-RetransmissionTimer). That is, when the high-speed retransmission RTT timer expires, the UE 100 tries to receive a transmission packet (retransmission packet) transmitted using the PDSCH. The UE 100 tries to receive the transmission packet while the DRX retransmission timer is operating.

Other Embodiments

A program causing a computer to execute each of the processing performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM and/or a DVD-ROM.

Circuits for executing processing performed by the UE 100 or the gNB 200 may be integrated, and at least a part of the UE 100 or the gNB 200 may be implemented as a semiconductor integrated circuit (chipset, system on a chip (SoC)).

Embodiments have been described above in detail with reference to the drawings, but specific configurations are not limited to those described above, and various design variation can be made without departing from the gist of the present disclosure. All or some of the embodiments, operations, processes, and steps may be combined without being inconsistent.

The phrases "based on" and "depending on" used in the present disclosure do not mean "based only on" and "only depending on," unless specifically stated otherwise. The phrase "based on" means both "based only on" and "based at least in part on". The phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

SUPPLEMENTARY NOTE

In one embodiment, (Supplementary note 1) A communication control method in a mobile communication system can include the steps of, at a base station: transmitting, to a user equipment, a skip notification indicating that transmission of a transmission packet is skipped when the base station does not retransmit the transmission packet; and configuring, for the user equipment, a timer value of a high-speed retransmission timer having a shorter timer value than a reference timer when the base station retransmits the transmission packet.

(Supplementary Note 2) The communication control method according to above (Supplementary Note 1) can further include the step of performing, at the user equipment, processing assuming that the transmission packet has been received, in response to reception of the skip notification.

(Supplementary Note 3) According to the communication control method according to above (Supplementary Note 1) or (Supplementary Note 2), the configuring step can include the step of transmitting, at the base station, the skip notification to the user equipment when the transmission packet satisfies a condition relating to an expiration date of the transmission packet.

(Supplementary Note 4) The communication control method according to any one of above (Supplementary Note 1) to (Supplementary Note 3) can further include the steps of: transmitting, at the base station, the timer value of the high-speed retransmission timer to the user equipment; activating, at the user equipment, the high-speed retransmission timer when failing to receive the transmission packet; and attempting, at the user equipment, to receive the transmission packet when the timer value of the high-speed retransmission timer expires.

According to one embodiment, (Supplementary note 5) a communication control method in a mobile communication system can include the step of transmitting, at a user equipment to a base station, a skip notification indicating that transmission of a transmission packet is skipped when the user equipment does not retransmit the transmission packet.

(Supplementary Note 6) The communication control method according to above (Supplementary Note 5) can further include the step of performing, at the base station, processing assuming that the transmission packet has been received, in response to reception of the skip notification.

(Supplementary Note 7) The communication control method according to above (Supplementary Note 5) or (Supplementary Note 6) can further include the step of transmitting, at the base station, a skip condition to the user equipment, and the step of transmitting the skip notification can include the step of transmitting, at the user equipment, the skip notification to the base station when the transmission packet satisfies the skip condition.

(Supplementary note 8) According to the communication control method according to above (Supplementary note 1) to (Supplementary note 7), the transmission packet can be a transmission packet for XR traffic.

REFERENCE SIGNS

1: Mobile communication system
20: CN
100: UE
110: Receiver
120: Transmitter
130: Controller
200: gNB
210: Transmitter
220: Receiver
230: Controller
300: AMF

The invention claimed is:

1. A communication control method in a mobile communication system, the communication control method comprising the steps of, at a network node:

transmitting, to a user equipment, a skip notification indicating that transmission of a transmission packet is skipped when the network node does not retransmit the transmission packet; and configuring, for the user equipment, a timer value of a high-speed retransmission timer having a shorter timer value than a reference timer when the network node retransmits the transmission packet.

2. The communication control method according to claim 1, further comprising performing, at the user equipment, processing assuming that the transmission packet has been received, in response to reception of the skip notification.

3. The communication control method according to claim 1, wherein the configuring comprises transmitting, at the network node, the skip notification to the user equipment when the transmission packet satisfies a condition relating to an expiration date of the transmission packet.

4. The communication control method according to claim 1, further comprising the steps of:

transmitting, at the network node, the timer value of the high-speed retransmission timer to the user equipment;

activating, at the user equipment, the high-speed retransmission timer when failing to receive the transmission packet; and attempting, at the user equipment, to receive the transmission packet when the timer value of the high-speed retransmission timer expires.

5. A communication control method in a mobile communication system, the communication control method comprising transmitting, at a user equipment to a network node, a skip notification indicating that transmission of a transmission packet is skipped when the user equipment does not retransmit the transmission packet.

6. The communication control method according to claim 5, further comprising performing, at the network node, processing assuming that the transmission packet has been received, in response to reception of the skip notification.

7. The communication control method according to claim 5, further comprising transmitting, at the network node, a skip condition to the user equipment, wherein the transmitting of the skip notification comprises transmitting, at the user equipment, the skip notification to the network node when the transmission packet satisfies the skip condition.

8. The communication control method according to claim 1, wherein the transmission packet is a transmission packet for XR traffic.

9. A user equipment comprising:

a receiver configured to receive from a network node, a skip notification indicating that transmission of a transmission packet is skipped when the network node does not retransmit the transmission packet, and receive from the network node, configuration information configuring a timer value of a high-speed retransmission timer having a shorter timer value than a reference timer when the network node retransmits the transmission packet.

* * * * *